US011935443B2

(12) United States Patent
Yu et al.

(10) Patent No.: US 11,935,443 B2
(45) Date of Patent: Mar. 19, 2024

(54) DISPLAY DEFECT DETECTION SYSTEM AND DETECTION METHOD THEREOF

(71) Applicant: LG Display Co., Ltd., Seoul (KR)

(72) Inventors: Yeong Yu, Paju-si (KR); Jong Ju Hong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/895,701

(22) Filed: Aug. 25, 2022

(65) Prior Publication Data

US 2023/0186803 A1 Jun. 15, 2023

(30) Foreign Application Priority Data

Dec. 13, 2021 (KR) .................. 10-2021-0177967

(51) Int. Cl.
*G09G 3/00* (2006.01)
*G06V 10/25* (2022.01)

(52) U.S. Cl.
CPC .............. *G09G 3/006* (2013.01); *G06V 10/25* (2022.01); *G09G 2320/0626* (2013.01); *G09G 2340/0407* (2013.01)

(58) Field of Classification Search
CPC ........... G09G 2320/0233; G09G 3/006; G09G 2330/10; G06T 7/0004
See application file for complete search history.

(56) References Cited

U.S. PATENT DOCUMENTS

| 2016/0153916 | A1* | 6/2016 | Lin ........................ G06T 7/001 348/86 |
| 2020/0025690 | A1* | 1/2020 | Koshihara ........... G06F 18/2433 |
| 2021/0312605 | A1* | 10/2021 | Nogami ................ G06T 7/0004 |
| 2021/0398462 | A1* | 12/2021 | Jang ....................... G09G 3/006 |

\* cited by examiner

*Primary Examiner* — Yuzhen Shen
(74) *Attorney, Agent, or Firm* — Morgan, Lewis & Bockius LLP

(57) ABSTRACT

A display defect detection circuit of a display defect detection system includes a preprocessing circuit configured to receive a capture image of a test pattern, displayed by a display panel, as a panel image including target Mura having a repetitive characteristic and preprocess the panel image to output a preprocessing image and a Mura detection circuit configured to decrease a total size of the preprocessing image on the basis of a size of the target Mura to generate a resize image, detect an edge component in the resize image to generate an edge map image having feature values, remove a feature value of a non-repetitive type among the feature values of the edge map image to generate a feature map image, and detect a display position of the target Mura on the basis of a final feature value of the target Mura calculated based on the feature map image.

12 Claims, 4 Drawing Sheets

DISPLAY DEFECT DETECTION SYSTEM AND DETECTION METHOD THEREOF

CROSS-REFERENCE TO RELATED APPLICATIONS

This application claims the benefit of the Korean Patent Application No. 10-2021-0177967 filed on Dec. 13, 2021, which is hereby incorporated by reference as if fully set forth herein.

BACKGROUND

Technical Field

The present disclosure relates to a display defect detection system and a detection method thereof.

Discussion of the Related Art

A display defect is a defect which occurs in a process of manufacturing a display panel, and various causes thereof include a malfunction of process facilities, a mistake of a worker, a fine drawback caused by dusts or motes, and a defect of a used film. When a display defect occurs, a screen characteristic of a display panel is not uniform and has a Mura state. There are various types (kinds), sizes, and levels of Mura, and particularly, Mura has various types such as a circular type, a linear type, a non-formal type, and a repeatedly smeared type.

There is a method where a worker directly detects Mura of a display panel with eyes. However, in such a detection method, eyes of a worker may be easily fatigued, a detection rate of a fine defect may be reduced, and a detection result may be changed by the subjective determination of a worker, and due to this, it is difficult to expect a constant-level detection result.

In a detection method using a Mura detection algorithm, because the boundary, brightness change, and contrast of a captured image are not clearly shown, a level of difficulty of Mura detection is high. In conventional algorithms, because a block-unit arithmetic operation and a sub-block-unit arithmetic operation based on a contrast ratio, a standard deviation (STD), and an amplitude are performed, an error of Mura detection is large when the number of arithmetic operations is large and Mura occurs in two or more adjacent blocks. Due to this, particularly, the accuracy of detection of formal/non-formal Mura having a repetitive characteristic is low.

SUMMARY

Accordingly, embodiments of the present disclosure are directed to a display defect detection system and a detection method thereof that substantially obviate one or more of the problems due to limitations and disadvantages of the related art.

An aspect of the present disclosure is to provide a display defect detection system and a detection method thereof, which may decrease the number of arithmetic operations for Mura detection and may increase the accuracy of detection of Mura having a repeated characteristic.

To achieve these and other aspects of the inventive concepts, as embodied and broadly described herein, a display defect detection circuit of a display defect detection system comprises a preprocessing circuit configured to receive a capture image of a test pattern, displayed by a display panel, as a panel image including target Mura having a repetitive characteristic and preprocess the panel image to output a preprocessing image and a Mura detection circuit configured to decrease a total size of the preprocessing image on the basis of a size of the target Mura to generate a resize image, detect an edge component in the resize image to generate an edge map image having feature values, remove a feature value of a non-repetitive type among the feature values of the edge map image to generate a feature map image, and detect a display position of the target Mura on the basis of a final feature value of the target Mura calculated based on the feature map image.

In another aspect, a display defect detection method includes receiving a capture image of a test pattern, displayed by a display panel, as a panel image including target Mura having a repetitive characteristic and preprocessing the panel image to output a preprocessing image, decreasing a total size of the preprocessing image on the basis of a size of the target Mura to generate a resize image, detecting an edge component in the resize image to generate an edge map image having feature values, removing a feature value of a non-repetitive type among the feature values of the edge map image to generate a feature map image, and detecting a display position of the target Mura on the basis of a final feature value of the target Mura calculated based on the feature map image.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Figure 1:
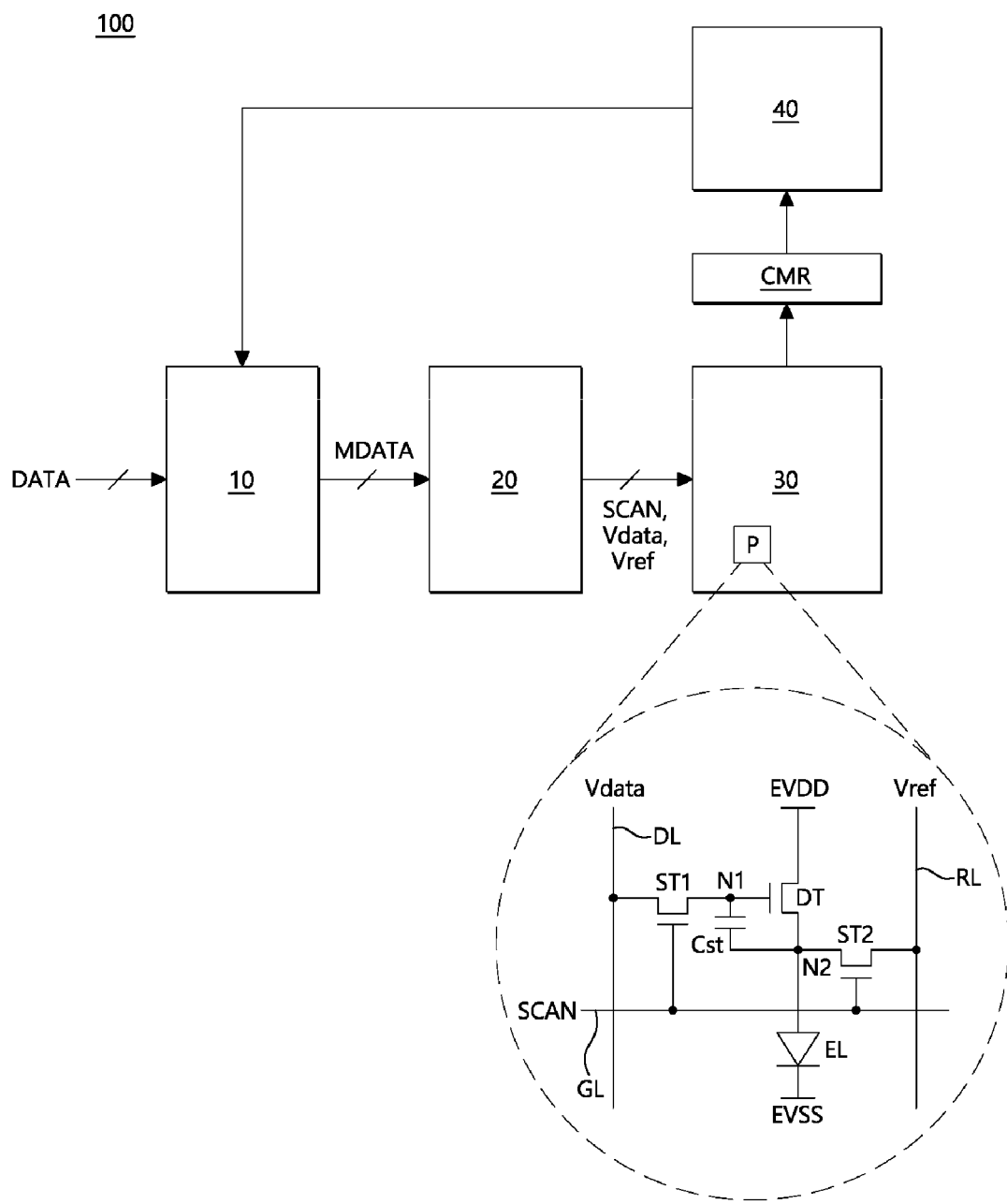
FIG. 1 is a diagram illustrating a display defect detection system according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram illustrating a display defect detection system 100 according to an embodiment of the present disclosure.

Referring to FIG. 1, the display defect detection system 100 may include a display apparatus, a luminance measurer CMR, and a display defect detection circuit 40.

The display apparatus may be an electroluminescent display apparatus, but is not limited thereto and may be applied to various types of display apparatuses. For example, the display apparatus may be implemented as various types such as liquid crystal display apparatuses, electrophoresis display apparatuses, electro-wetting display apparatuses, and quantum dot display apparatuses. In the present embodiment, an electroluminescent display apparatus will be mainly described below.

The display apparatus may include a controller 10, a panel driver 20, and a display panel 30.

A screen including a plurality of pixel lines may be provided in the display panel 20, and a plurality of pixels P may be included in each of the plurality of pixel lines. Here, a "pixel line" may denote a set of signal lines and pixels P adjacent to one another in one direction. The signal lines may include a plurality of data lines DL for supplying data voltages Vdata to the pixels P, a plurality of reference voltage lines RL for supplying a reference voltage Vref to the pixels P, a plurality of gate lines GL for supplying a scan signal to the pixels P, and a plurality of high level power lines for supplying a high level pixel voltage EVDD to the pixels P.

The pixels P of the display panel 30 may be arranged as a matrix type to configure a pixel array and may provide a screen which displays an image. Each of the pixels P may be connected to one of the data lines DL, one of the reference voltage lines RL, one of the high level power lines, and one of the gate lines GL. Each pixel P may be further supplied with a low level pixel voltage EVSS from the panel driver 20.

Each pixel P may include a light emitting device EL, a driving thin film transistor (TFT) DT, a plurality of switch TFTs ST1 and ST2, and a storage capacitor Cst, but is not limited thereto. The driving TFT DT and the switch TFTs ST1 and ST2 may each be implemented with an NMOS transistor, but are not limited thereto.

The light emitting device EL may be a light emitting device which emits light having strength corresponding to a pixel current applied from the driving TFT DT. The light emitting device EL may be implemented with an organic light emitting diode including an organic emission layer, or may be implemented with an inorganic light emitting diode including an inorganic emission layer. An anode electrode of the light emitting device EL may be connected to a second node N2, and a cathode electrode thereof may be connected to an input terminal for the low level pixel voltage EVSS.

The driving TFT DT may be a driving element which generates a pixel current on the basis of a gate-source voltage thereof. A gate electrode of the driving TFT DT may be connected to a first node N1, a first electrode thereof may be connected to an input terminal for the high level pixel voltage EVDD through the high level power line, and a second electrode thereof may be connected to the second node N2.

The switch TFTs (for example, first and second switch TFTs) ST1 and ST2 may be switch elements which set the gate-source voltage of the driving TFT DT and connect the second electrode of the driving TFT DT to the reference voltage line RL.

The first switch TFT ST1 may be connected between a data line DL and the first node N1 and may be turned on based on a scan signal SCAN from a gate line GL. The first switch TFT ST1 may be turned on in programming for image driving. When the first switch TFT ST1 is turned on, the data voltage Vdata may be applied to the first node N1. A gate electrode of the first switch TFT ST1 may be connected to the gate line GL, a first electrode thereof may be connected to the data line DL, and a second electrode thereof may be connected to the first node N1.

The second switch TFT ST2 may be connected between the reference voltage line RL and the second node N2 and may be turned on based on the scan signal SCAN from the gate line GL. The second switch TFT ST2 may be turned on in programming for image driving and may apply a reference voltage Vref to the second node N2. A gate electrode of the second switch TFT ST2 may be connected to the gate line GL, a first electrode thereof may be connected to the reference voltage line RL, and a second electrode thereof may be connected to the second node N2.

The storage capacitor Cst may be connected between the first node N1 and the second node N2 and may hold a gate-source voltage of the driving TFT DT during a certain period.

The controller 10 may include a timing controller and a data modulator.

The timing controller may control an operation timing of the panel driver 20 with reference to timing signals (for example, a vertical synchronization signal Vsync, a horizontal synchronization signal Hsync, a dot clock signal DCLK, and a data enable signal DE) input from a host system.

The data modulator may modulate video data DATA input the host system with reference to a predetermined Mura compensation table. Compensation values corresponding to position information about target Mura defected by the display defect detection circuit 40 may be stored at gray levels in the Mura compensation table. The data modulator may transfer modulated image data MDATA to the panel driver 20 through an internal interface.

The panel driver 20 may drive the pixels P included in the screen of the display panel 30. The panel driver 20 may include a data driver which drives data lines DL connected to the pixels P, a gate driver which drives gate lines GL connected to the pixels P, and a power driver which drives reference voltage lines RL connected to the pixels P and high level power lines connected to the pixels P.

The data driver may convert the image data MDATA, obtained through modulation based on control by the controller 10, into a data voltage Vdata and may provide the data voltage Vdata to the screen. The data voltage Vdata may be supplied to the screen through the data line DL.

The gate driver may generate the scan signal SCAN on the basis of control by the controller 10 and may provide the scan signal SCAN to the screen on the basis of an application timing of the data voltage Vdata. The scan signal SCAN may be supplied to the screen through the gate line GL, and thus, a pixel line to which the data voltage Vdata is to be applied may be selected. The gate driver may be formed directly in a non-display area outside the screen of the display panel 30.

The luminance measurer CMR may photograph a test pattern displayed by the display panel 30 to generate a panel image including formal/non-formal Mura (target Mura) having a repetitive characteristic. The luminance measurer CMR may be a camera CMR, but is not limited thereto.

The display defect detection circuit 40 may preprocess and resize the panel image input from the luminance measurer CMR to generate a resize image. The display defect detection circuit 40 may replace a conventional block unit operation process or a sub-block unit operation process with a resize process. Because there is no block unit operation process or sub-block unit operation process, the number of arithmetic operations and a time needed for Mura detection and a Mura detection error may be considerably reduced. The display defect detection circuit 40 may adjust a resize ratio on the basis of a size of target Mura, and thus, may effectively detect Mura having various sizes.

The display defect detection circuit 40 may detect an edge component in the resize image to generate an edge map image having feature values and may remove a feature value of a non-repetitive type among feature values of the edge map image through a feature smoothing process to generate a feature map image. Only feature values of a repetitive type may configure the feature map image through the feature smoothing process, and thus, the accuracy of detection of formal/non-formal Mura having a repetitive characteristic may be considerably reduced.

The display defect detection circuit 40 may detect a display position of target Mura on the basis of a final feature value of the target Mura calculated based on the feature map image. The display position of the target Mura detected by the display defect detection circuit 40 may be based on constructing the Mura compensation table. In the Mura compensation table, position information about the target Mura may be read address information for reading a compensation value.

Figure 2:
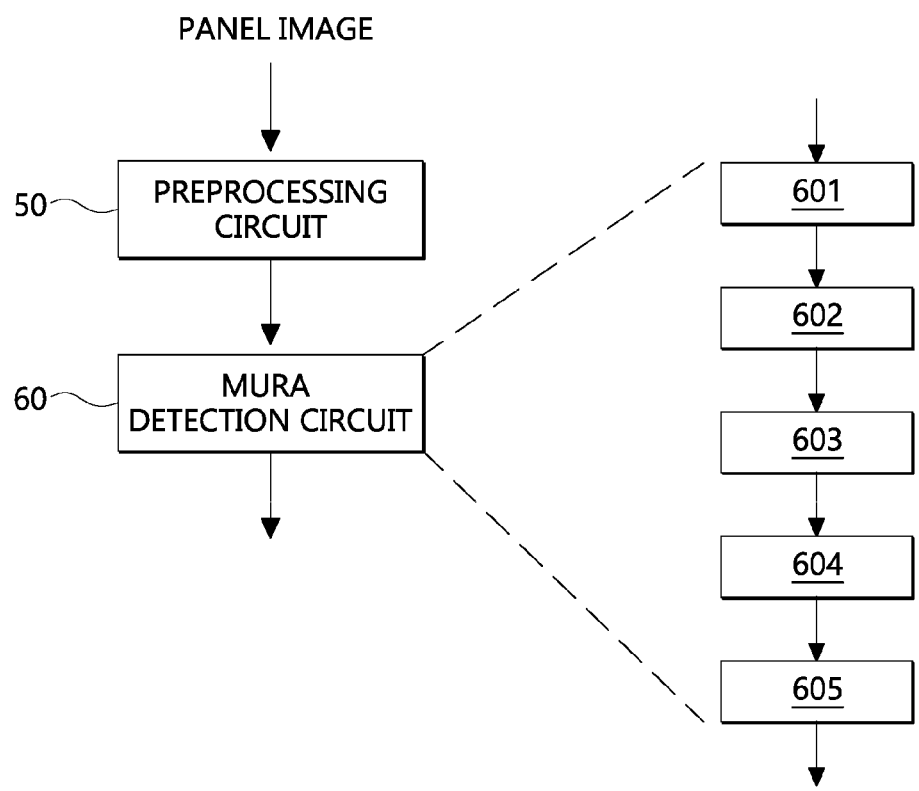
FIG. 2 is a diagram illustrating a display defect detection circuit of FIG. 1.
Figure 3:
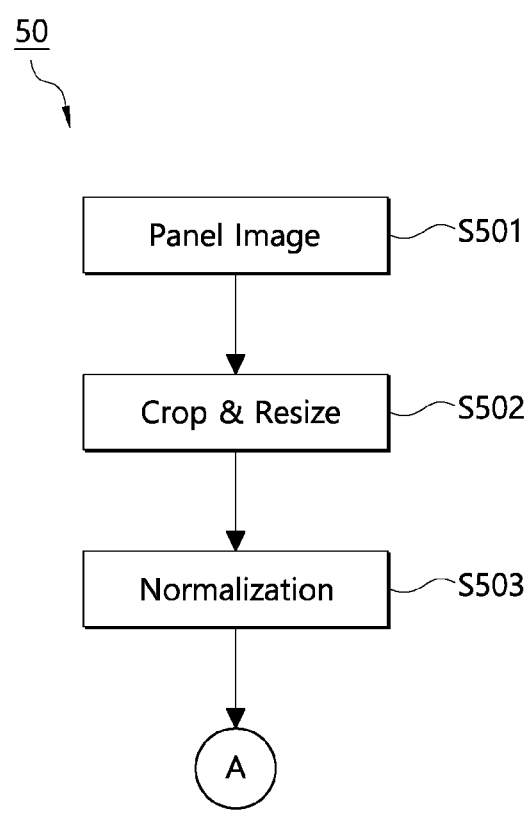
FIG. 3 is a diagram illustrating a preprocessing operation performed by a preprocessing circuit of FIG. 2.
Figure 4:
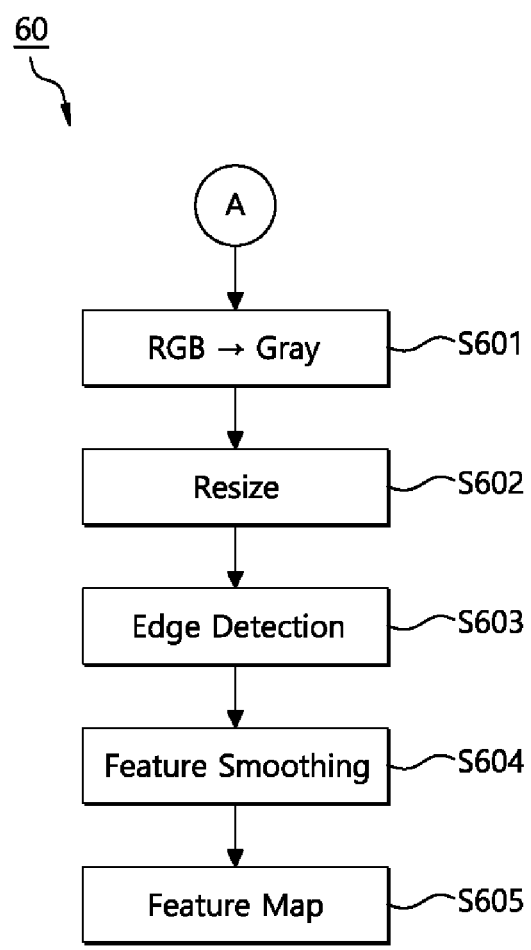
FIG. 4 is a diagram illustrating a Mura detection operation performed by a Mura detection circuit of FIG. 2.

FIG. 2 is a diagram illustrating the display defect detection circuit 40 of FIG. 1. FIG. 3 is a diagram illustrating a preprocessing operation performed by a preprocessing circuit of FIG. 2. FIG. 4 is a diagram illustrating a Mura detection operation performed by a Mura detection circuit of FIG. 2.

Referring to FIG. 2, the display defect detection circuit 40 may include a preprocessing circuit 50 and a Mura detection circuit 60.

Referring to FIG. 2, the preprocessing circuit 50 may receive a capture image of a test pattern, displayed by the display panel, as a panel image including target Mura and may preprocess the panel image to output a preprocessing image.

A preprocessing process performed by the preprocessing circuit 50 may include a process (S501) of receiving a panel image as in FIG. 3, a process (S502) of cropping the panel image to extract a region of interest (ROI), and a process (S503) of normalizing a color sense or brightness of the ROI.

The accuracy of Mura detection may be reduced by a performance deviation of the panel image based on a photograph environment or a panel characteristic, and such a side effect may be reduced by the preprocessing process.

Referring to FIG. 2, the Mura detection circuit 60 may include a resize circuit 602, an edge map generator 603, a feature smoothing circuit 604, and a final feature value calculator 605, and moreover, may further include a gray converter 601 for decreasing an operation time needed for Mura detection. A configuration and an operation of the Mura detection circuit 60 will be additionally described below in conjunction with FIG. 4.

The gray converter 601 may convert a preprocessing image from an RGB true color-based image into a gray-scale image by using a known rgb2gray function (S601). The rgb2gray function may remove color information and chroma information while maintaining luminance, and thus, may convert an RGB image into a gray-scale image. An operation time for Mura detection may be more reduced in the gray-scale image than the RGB image.

The resize circuit 602 may decrease a total size of the preprocessing image on the basis of a size of target Mura, and in this case, may adaptively adjust a resize ratio of the preprocessing image on the basis of a size of the target Mura to effectively respond to a size of the target Mura (S602). Because the resize circuit 602 decreases a total size of the preprocessing image instead of decreasing a size of the preprocessing image by block units, a problem (i.e., an error of Mura detection increases when Mura occurs in two or more adjacent blocks) occurring in a conventional block unit operation or sub-block unit operation may be prevented.

The edge map generator 603 may detect an edge component in a resize image input from the resize circuit 602 to calculate feature values and may generate an edge map image having the feature values (S603). To this end, the edge map generator 603 may include a Sobel filter. The edge map generator 603 may detect edge features in an x-axis direction and a y-axis direction by using the Sobel filter and may weight-average the edge features to generate the edge map image. The edge map image generated by the Sobel filter may be a binary image.

The feature smoothing circuit 604 may remove noise and a feature value of a non-repetitive type among the feature values of the edge map image and may generate the feature map image from only feature values having a repetitive feature (S604 and S605). The feature smoothing circuit 604 may remove noise included in the edge map image in generating the feature map image, and thus, a separate noise removal circuit may be omitted.

The final feature value calculator 605 may calculate, as a final feature value of the target Mura, a largest feature value among the feature values included in the feature map image.

As described above, the Mura detection circuit 60 according to the present embodiment may decrease the number of arithmetic operations for Mura detection by using the elements and may increase the accuracy of detection of Mura having a repetitive characteristic. The Mura detection circuit 60 according to the present embodiment may accurately detect dotted Mura, band Mura, and non-formal Mura having a repetitive characteristic.

A display defect detection method according to an embodiment of the present disclosure may be based on the display defect detection system described above.

The display defect detection method according to an embodiment of the present disclosure may include a step of receiving a capture image of a test pattern, displayed by the display panel, as a panel image including target Mura and preprocessing the panel image to output a preprocessing image, a step of decreasing a total size of the preprocessing image on the basis of a size of the target Mura to generate a resize image, a step of detecting an edge component in the resize image to generate an edge map image having feature values, a step of removing a feature value of a non-repetitive type among the feature values of the edge map image to generate a feature map image, and a step of detecting a display position of the target Mura on the basis of a final feature value of the target Mura calculated based on the feature map image.

In the embodiments of the present disclosure, a block-based arithmetic operation may not be applied and a whole panel image may be processed by resizing an image, and thus, the number of arithmetic operations needed for Mura detection may be reduced and an error of Mura detection may decrease.

In the embodiments of the present disclosure, a resize ratio may be adjusted based on a size of target Mura, and thus, Mura having various sizes may be effectively detected.

In the embodiments of the present disclosure, a feature value of a non-repetitive type among feature values of an edge map image may be removed through a feature smoothing process, and a feature map image may be generated based on only feature values of a repetitive type, thereby considerably increasing the accuracy of detection of formal/non-formal Mura having a repetitive characteristic.

In the embodiments of the present disclosure, noise included in the edge map image may be removed together in the feature smoothing process, and thus, a separate noise removal circuit may be omitted.

In the embodiments of the present disclosure, an arithmetic operation may be performed on a gray-scale image instead of an RGB true color-based image so as to detect Mura, and thus, an operation time and the number of arithmetic operations may be reduced.

The effects according to the present disclosure are not limited to the above examples, and other various effects may be included in the specification.

It will be apparent to those skilled in the art that various modifications and variations can be made in the display defect detection system and the detection method thereof of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display defect detection system comprising a display defect detection circuit, wherein the display defect detection circuit comprises:
   a preprocessing circuit configured to receive a capture image of a test pattern, displayed by a display panel, as a panel image including target Mura having a repetitive characteristic and preprocess the panel image to output a preprocessing image; and
   a Mura detection circuit configured to decrease a total size of the preprocessing image on the basis of a size of the target Mura to generate a resize image, detect an edge component in the resize image to generate an edge map image having feature values, remove a feature value of a non-repetitive type among the feature values of the edge map image through a feature smoothing process that does not use a threshold to generate a feature map image, and detect a display position of the target Mura on the basis of a final feature value of the target Mura calculated based on the feature map image,
   wherein the feature map image includes only feature values with a repetitive characteristic and does not include feature values with non-repetitive characteristics.

2. The display defect detection system of claim 1, wherein the Mura detection circuit is configured to adaptively adjust a resize ratio of the preprocessing image on the basis of a size of the target Mura.

3. The display defect detection system of claim 1, wherein the Mura detection circuit is configured to calculate, as a final feature value of the target Mura, a largest feature value among the feature values included in the feature map image.

4. The display defect detection system of claim 1, wherein the Mura detection circuit is further configured to remove noise included in the edge map image in generating the feature map image.

5. The display defect detection system of claim 1, wherein the Mura detection circuit is further configured to convert the preprocessing image from an RGB true color-based image into a gray-scale image, before decreasing a size of the preprocessing image.

6. The display defect detection system of claim 1, wherein a preprocessing process performed by the preprocessing circuit comprises:
   a process of cropping the panel image to extract a region of interest (ROI) including the target Mura; and
   a process of normalizing a color sense or brightness of the region of interest.

7. The display defect detection system of claim 1, wherein the Mura detection circuit comprises:
   a gray converter configured to convert the preprocessing image from an RGB true color-based image into a gray-scale image;
   a resize circuit configured to decrease a total size of the preprocessing image on the basis of a size of the target Mura and adaptively adjust a resize ratio of the preprocessing image on the basis of a size of the target Mura;
   an edge map generator configured to detecting an edge component in the resize image to generate an edge map image having feature values;

a feature smoothing circuit configured to remove noise and a feature value of a non-repetitive type among the feature values of the edge map image; and a final feature value calculator configured to calculate, as a final feature value of the target Mura, a largest feature value among the feature values included in the feature map image.

8. A display defect detection method, comprising:

receiving a capture image of a test pattern, displayed by a display panel, as a panel image including target Mura having a repetitive characteristic and preprocessing the panel image to output a preprocessing image;

decreasing a total size of the preprocessing image on the basis of a size of the target Mura to generate a resize image;

detecting an edge component in the resize image to generate an edge map image having feature values;

removing a feature value of a non-repetitive type among the feature values of the edge map image through a feature smoothing process that does not use a threshold to generate a feature map image; and detecting a display position of the target Mura on the basis of a final feature value of the target Mura calculated based on the feature map image, wherein the feature map image includes only feature values with a repetitive characteristic and does not include feature values with non-repetitive characteristics.

9. The display defect detection method of claim 8, wherein the generating the resize image comprises adaptively adjusting a resize ratio of the preprocessing image on the basis of a size of the target Mura.

10. The display defect detection method of claim 8, wherein a largest feature value among the feature values included in the feature map image is calculated as a final feature value of the target Mura.

11. The display defect detection method of claim 8, wherein the generating the feature map image further comprises removing noise included in the edge map image.

12. The display defect detection method of claim 8, further comprising converting the preprocessing image from an RGB true color-based image into a gray-scale image, before decreasing a size of the preprocessing image.

* * * * *